United States Patent
Zhang et al.

(10) Patent No.: US 11,428,665 B2
(45) Date of Patent: Aug. 30, 2022

(54) NON-DESTRUCTIVE DETACHABLE CONNECTIVE STRUCTURE OF ELECTROPHORESIS PRECAST GEL

(71) Applicant: Jiangsu Youran Biotechnology Co., Ltd., Lianyungang (CN)

(72) Inventors: Junjie Zhang, Lianyungang (CN); Rui Duan, Lianyungang (CN); Xin Chen, Zhenjiang (CN); Boyan Zhang, Pittsburgh, PA (US)

( * ) Notice: Subject to any disclaimer, the term of this patent is extended or adjusted under 35 U.S.C. 154(b) by 182 days.

(21) Appl. No.: 16/854,696

(22) Filed: Apr. 21, 2020

(65) Prior Publication Data

US 2021/0181149 A1    Jun. 17, 2021

(30) Foreign Application Priority Data

Dec. 16, 2019   (CN) .......................... 201922252597.X

(51) Int. Cl.
*G01N 27/453*   (2006.01)
*G01N 27/447*   (2006.01)

(52) U.S. Cl.
CPC ..... *G01N 27/453* (2013.01); *G01N 27/44704* (2013.01); *G01N 27/44747* (2013.01)

(58) Field of Classification Search
CPC ....................... G01N 27/453; G01N 27/44704
See application file for complete search history.

(56) References Cited

U.S. PATENT DOCUMENTS

| | | | | |
|---|---|---|---|---|
| 4,919,784 A | * | 4/1990 | Yetman | G01N 27/44704 204/612 |
| 2018/0095055 A1 | * | 4/2018 | Schicht | B01L 9/54 |

OTHER PUBLICATIONS

CN206348296U machine translation (Year: 2017).*
Latch—definition by Merriam-Webster (Year: 2021).*

* cited by examiner

*Primary Examiner* — Luan V Van
*Assistant Examiner* — Caitlyn Mingyun Sun
(74) *Attorney, Agent, or Firm* — Knobbe, Martens, Olson & Bear, LLP

(57) ABSTRACT

Structures for improved electrophoretic precast gel substrates are disclosed herein. In some embodiments, an electrophoretic precast gel substrate includes a front plate comprising a first tenon-and-mortise connective structure, and a rear plate comprising a second tenon-and-mortise connective structure. The front plate and the rear plate can include snap features that are configured to provide a snap fit with a corresponding structure. The front and rear plates can be configured to be coupled and/or decoupled along the first and second tenon-and-mortise connective structures.

18 Claims, 3 Drawing Sheets

NON-DESTRUCTIVE DETACHABLE CONNECTIVE STRUCTURE OF ELECTROPHORESIS PRECAST GEL

CROSS-REFERENCE TO RELATED APPLICATIONS

This application claims the benefit of priority of Chinese Application No. 201922252597.X filed on Dec. 16, 2019 entitled "A Non-destructive detachable connective structure of electrophoresis precast gel," the entire contents of which is incorporated herein by reference in its entirety.

FIELD

The present invention involves the field of electrophoresis precast gel technology, especially the non-destructive detachable connective structures of electrophoresis precast gel substrates.

BACKGROUND

Electrophoresis precast gel technology has been widely used in many field such as agriculture, biology, medicine etc. The substrates of precast gels currently on the market are monolithic structure that cannot be decoupled non-destructively.

SUMMARY

Examples of precast gel substrate assemblies are described herein.

In some embodiments, an electrophoretic precast gel substrate includes a front plate comprising a first tenon-and-mortise connective structure, and a rear plate comprising a second tenon-and-mortise connective structure. The front plate and the rear plate can include snap features that are configured to provide a snap fit with a corresponding structure. The front and rear plates can be configured to be coupled and/or decoupled along the first and second tenon-and-mortise connective structures.

Figure 1:
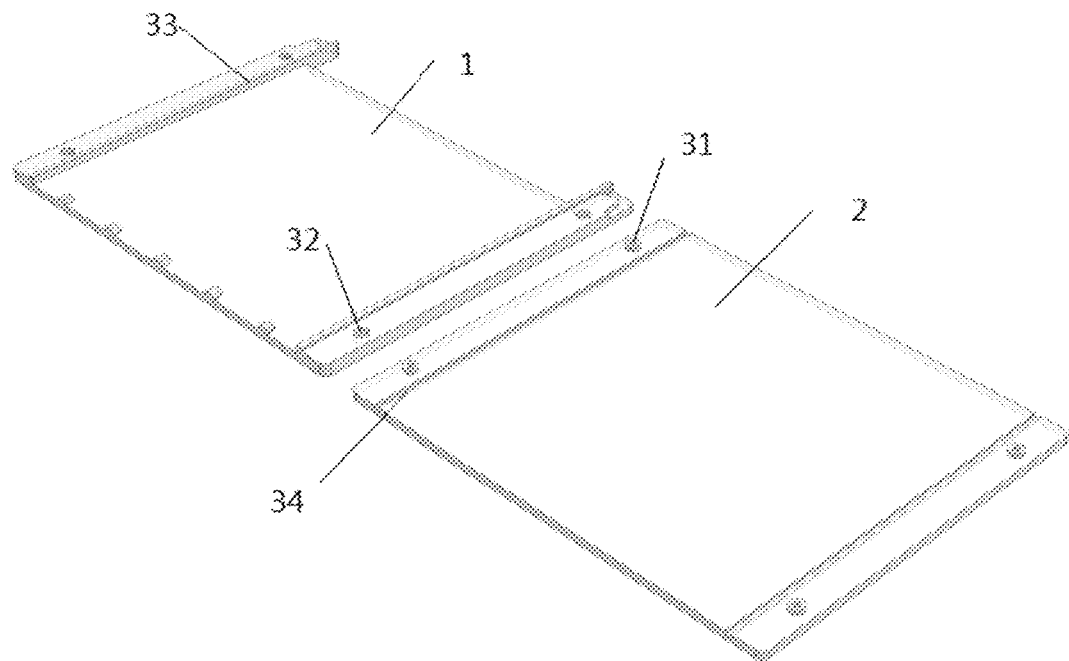
FIG. 1 shows the schematic structure of the positioning points sealing grooves and sealing ribs.
Figure 2:
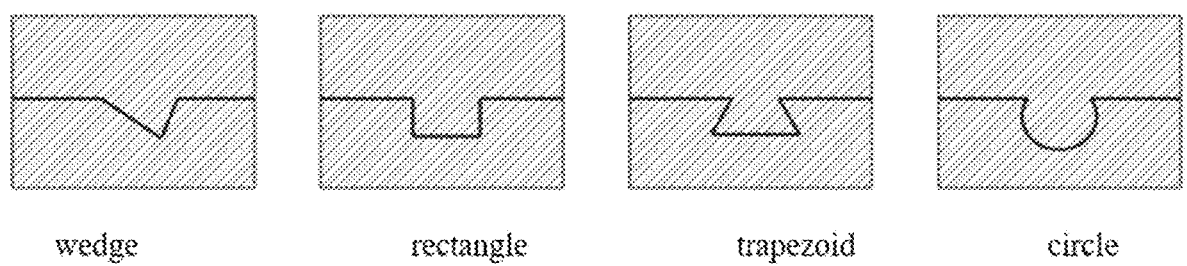
FIG. 2 is a schematic cross-sectional view of a sealing groove and a sealing rib with a positioning protrusion and a positioning groove according to one embodiment.

Pictured are the following: 1. Front plate; 2. Rear plate; 4. Buckle; 31. Positioning protrusion; 32. Positioning groove; 33. Sealing groove; 34. Sealing rib; 35. latch; 36. Composite form.

DETAILED DESCRIPTION

The purpose of the invention is to overcome shortcomings of existing products, and provide a precast gel substrates for electrophoresis that is tightly combined, has a good sealing effect, can be non-destructively decoupled (e.g., split) and can be reused. As used herein, a non-destructive coupling can include a tenon-and-mortise coupling or structure. Various techniques can be used in their production and they may take one or more forms, as described herein. For example, the combined structure of electrophoretic precast gel substrates can include a front plate and a rear plate. The front and/or rear plate may be characterized in that the front plate and/or the rear plate includes a tenon-and-mortise connective structure and/or an external-type buckle connection.

In some embodiments, the positioning protrusions and positioning grooves can be used together or separately with other tenon-and-mortise structures or external-type buckles. The sectional shapes (e.g., a shape of a cross-section) of the positioning protrusions and/or corresponding positioning grooves can include wedges, rectangles, trapezoids, and circles, and/or a composite shape from the above basic shapes.

The front plate and/or the rear plate may comprise artificial or natural materials. For example, artificial materials may include, but are not limited to, PVC, PP, ABS, PS, PMMA.

The front and rear plates can be respectively provided with tenon-and-mortise structures on both sides or the periphery, and the tenon-and-mortise structure is divided into positioning protrusions, positioning grooves and sealing grooves, sealing ribs, latches and composite forms.

In some embodiments, the positioning protrusions and positioning grooves are used together or separately with other tenon-and-mortise structures or external type buckles. The sectional shapes of the positioning protrusions and positioning grooves include, but are not limited to, wedge, rectangle, trapezoid, circle, and/or a composite shape created from the above basic shapes. A dimension (e.g., width, height, depth) of the sectional shape may be about 0.1 mm, about 0.5 mm, about 1 mm, about 2 mm, about 4 mm, about 10 mm, about 12 mm, about 15, mm, about 20 mm, about 25 mm, about 30 mm, about 35 mm, about 40 mm, about 45 mm, about 50 mm, about 100 mm, about 500 mm, any value therein or fall within any range having endpoint therein. For example, in some embodiments, the length×width of the sectional shape may be 0.1 mm×0.1 mm. In some embodiments, the length×width is about 500 mm×500 mm.

A sealing groove and/or a sealing rib may be used singly or in combination with another tenon-and-mortise structure and/or an external buckle. The cross-sectional shape of the sealing groove and/or of the sealing rib can include a wedge shape, a rectangular shape, a trapezoid shape, a circular shape, or a composite shape created from any of the above shapes. The shape can have a width of any value above (e.g., about 0.1 mm to about 500 mm) and a length of any value above (e.g., about 0.1 mm to about 500 mm). In some embodiments, the length may be as large as about 2500 mm.

One or more supplemental structures or supplemental elements can be used. A supplemental structure can include a latch or a buckle, as described herein. A latch (or bolt) may be used in combination with other tenon-and-mortise structure or external buckles disclosed herein. The shape of the cross-section of the latch may include a wedge shape, rectangular shape, trapezoid shape, circular shape, and/or a composite shape created from the basic shapes described above. It may have a height of between about 0.1 mm to 1000 mm, a width of between about 0.1 mm to 500 mm, and/or a length of between about 0.1 mm to 2500 mm. Other values described above may apply to one or more dimensions of the latch.

The front and/or rear plates may be respectively provided with external-type buckles on one or both sides or the periphery. The internal structure of the external-type buckles can include positioning protrusions, positioning grooves, sealing grooves, and/or sealing ribs.

The positioning protrusions and positioning grooves are used together or separately with other tenon-and-mortise structures or external-type buckles. The cross-sectional shape of the combination can include a wedge, rectangle, trapezoid, circle, and/or a composite form created from the above shapes. The protrusions and/or grooves can have a width of any value above (e.g., about 0.1 mm to about 500 mm) and a length of any value above (e.g., about 0.1 mm to about 500 mm).

The sealing groove and/or the sealing rib may be used in combination with another tenon-and-mortise structure and/or an external buckle described herein. A separate shape may be used. The cross-sectional shape of the sealing groove and the sealing rib can include a wedge shape, a rectangular shape, a trapezoid shape, a circular shape, and/or a composite form created from the above-mentioned foundation shapes. The sealing groove and/or sealing rib may have a width of any value above (e.g., about 0.1 mm to about 500 mm) and a length of any value above (e.g., about 0.1 mm to about 500 mm). In some embodiments, the length may be as large as about 2500 mm.

The gel substrates disclosed herein can have a number of advantages. The front plate and the rear plate may be made of artificial or natural materials such as PVC, PP, ABS, PS, PMMA, etc., and they may be sealed by tenon-and-mortise structure or other bonding methods, and can be assembled to form a gel infusion cavity with a certain thickness. The gel substrate can have a tight combination, good sealing effect, easy disassembly, and good reusability. The structures disclosed herein can avoid reduce difficulties in disassembly and/or an inability to reuse for the adhesive and monolithic structure. For example, in some embodiments, one or more features described herein may include a snap feature configured to allow a snap fit with another feature (e.g., a corresponding feature).

Reference will now be made to the figures. As shown in FIGS. 1-5, a bonding structure for electrophoretic precast gel includes a front plate 1 and a rear plate 2, the front plate 1 and the rear plate 2 are connected by a tenon-and-mortise structure, and the front and rear plates may be disposed on one or both sides or and/or around the tenon-and-mortise structure. A tenon-and-mortise ridge is provided, which is divided into a positioning protrusion 31, a positioning groove 32, a sealing groove 33, a sealing rib 34, a latch 35 and a composite form 36.

The positioning protrusions 31 and the positioning grooves 32 can be used in conjunction with other structures or exist separately and their number is bigger than or equal to zero. The cross-sectional shape of the combination includes, but is not limited to a wedge, rectangle, trapezoid, circle, and/o a composite of the basic shapes. Its position includes but is not limited to the periphery of the substrate, and its size is between about 0.1 mm×0.1 mm to about 500 mm×500 mm.

The sealing grooves 33 and the sealing ribs 34 can be used in conjunction with other structures or exist separately and their number is bigger than or equal to zero. The cross-sectional shape of the combination mode includes, but is not limited to wedge shape, rectangular shape, trapezoid shape, circular shape, and/or composites of the above basic shapes. Its position includes but is not limited to the periphery of the substrate, and its width is between about 0.1 mm to about 500 mm, and its length is between about 0.1 mm and about 2500 mm.

Figure 3:
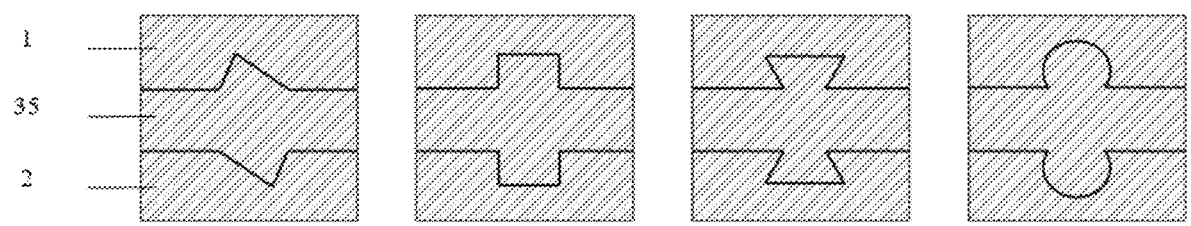
FIG. 3 is a schematic diagram of a latch and a cross-section of the latch, according to one embodiment.
Figure 4:
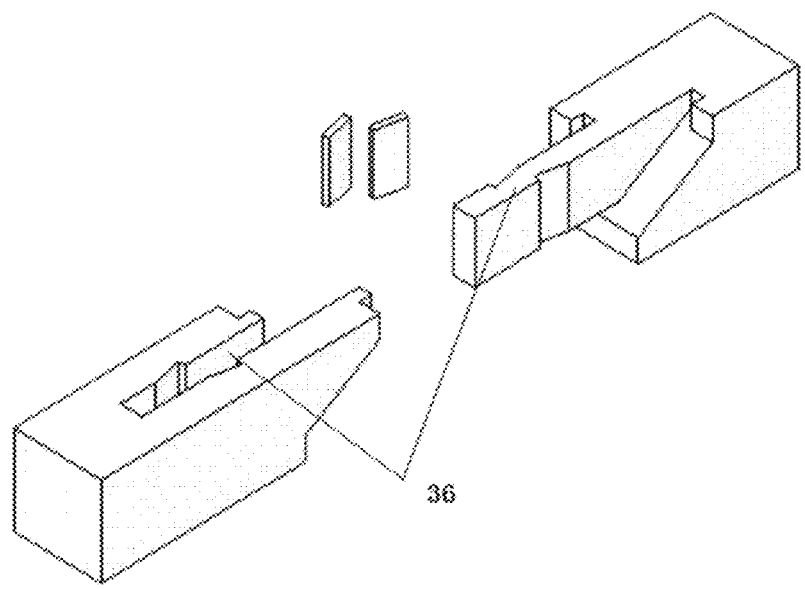
FIG. 4 shows an example of a composite form, according to one embodiment.

FIG. 3 shows an example latch 35 used between the front plate 1 and the rear plate 2. The latch 35 can be used in conjunction with other structures or can exist alone. The number latches 35 may be greater than or equal to zero. The cross-sectional shape of its combination can include a wedge, rectangle, trapezoid, circle, and/or a composite form built from the above basic shapes. The location includes but is not limited to the periphery of the substrate. Its height may be between about 0.1 mm and about 1000 mm, its width may be between about 0.1 mm and about 500 mm, and/or its length may be between about 0.1 mm and about 2500 mm.

The composite form 36 can be used in conjunction with other structures or can exist alone and its number is greater than or equal to zero. Its shape includes, but is not limited to, a wedge shape, a rectangular shape, a trapezoidal shape, a circular shape, and/or a composite form created from the basic shapes disclosed above. Not limited to the periphery of the substrate, its width may be between about 0.1 m and about 500 mm, and its length may be between about 0.1 mm and about 2500 mm.

Figure 5:
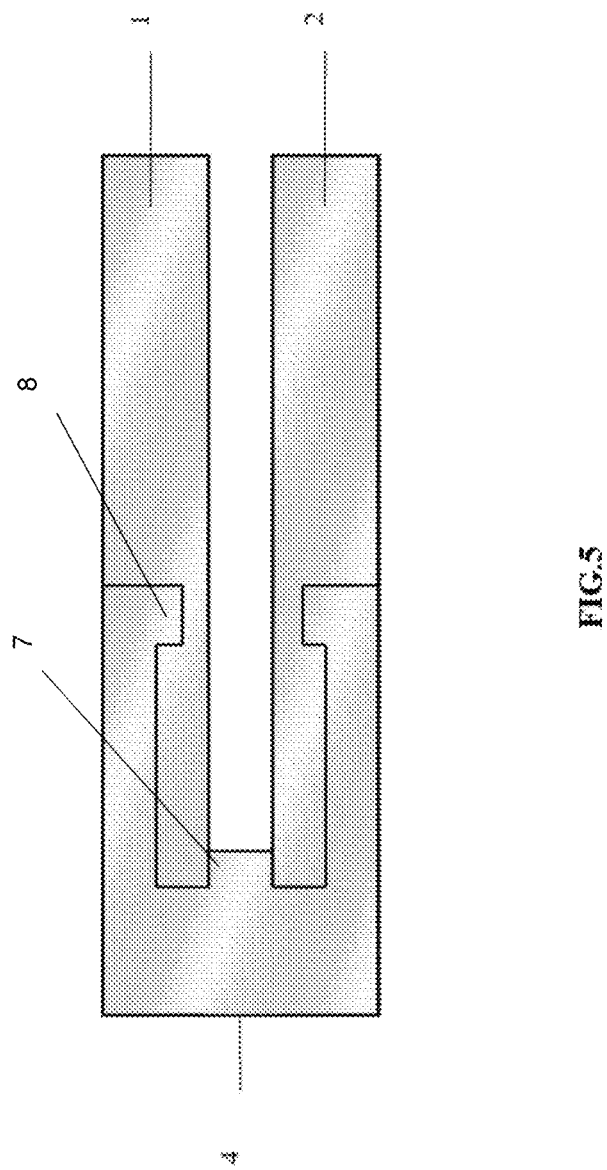
FIG. 5 is a schematic cross-sectional view of an external-type buckle structure, according to one embodiment.

FIG. 5 shows a cross section of an example buckle 4 that couples to the front plate 1 and the rear plate 2. The internal structure 7,8 of the external type buckle 4 includes, but is not limited to, positioning protrusions, positioning grooves and sealing grooves, sealing ribs, and composite forms. Such tenon-and-mortise structures may be found on one or more of the internal structure 7 and/or the internal structure 8, and one or both may include any of the connective structures disclosed herein. The internal structures 7,8 can couple and/or decouple with corresponding connective structures in the front plate 1 and/or rear plate 2.

The positioning protrusions and positioning grooves can be used in conjunction with other structures or exist alone and the number of which is greater than or equal to zero. The cross-sectional shape of the combination may include a wedge, a rectangle, a trapezoid, a circle, and/or any shape created from the basic shapes above. The position of the protrusion(s) and/or groove(s) may include the periphery of the substrate, and its size (e.g., length×width) may be between about 0.1 mm×0.1 mm to about 500 mm×500 mm.

The sealing grooves and sealing ribs can be used in conjunction with other structures or exist separately. The number of sealing grooves and/or sealing ribs may be greater than or equal to zero. The cross-sectional shape of the combination can include a wedge, rectangle, trapezoid, circle, and/or a composite form created from the above basic shapes. A position of a groove and/or rib may be along the periphery of the substrate, and its width may be between about 0.1 mm to about 500 mm, and its length may be between about 0.1 mm and about 2500 mm.

In some embodiments, the front plate and the rear plate are made of artificial or natural materials. The artificial materials include PVC, PP, ABS, PS, PMMA. Various nonlimiting embodiments will now be presented:

Embodiment 1: The substrate body includes a front plate 1 and a rear plate 2. The front plate is provided with positioning grooves 32 and sealing ribs 33 on both sides, and the rear plate is provided with positioning protrusions 31 and sealing grooves 34 on both sides. (Shown in FIG. 1).

Embodiment 2: The substrate main body includes a front plate 1 and a rear plate 2. The front plate and the rear plate are respectively provided with a sealing groove 34 on both sides and a latch 35 that cooperates with the sealing groove. The substrates are tightly bonded and have a good sealing effect.

Embodiment 3: The substrate main body includes a front plate 1 and a rear plate 2. The front plate and the rear plate are respectively provided with a composite form 36 (shown in FIG. 4) on both sides, and the composite form can be used together to make the substrate tightly combined, with good sealing effect.

Embodiment 4: The main body of the substrate includes a front plate 1, a rear plate 2 and an external buckle 4, and the front plate and the rear plate are respectively provided with grooves or protrusions corresponding to the buckle on both sides to make the substrates tightly bonded, with good sealing effect (shown in FIG. 5).

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

What is claimed is:

1. An electrophoretic precast gel substrate comprising:
    a front plate comprising a first composite form having a cross-section comprising at least a first and a second shape, the first shape disposed on the first surface of the first composite form and the second shape disposed on the second surface of the first composite form, wherein each of the first and the second shape are selected from a group consisting of: a wedge, a trapezoid, a rectangle, a circle; and
    a rear plate comprising a second composite form having a cross-section corresponding to the cross-section of the first composite form,
    wherein the first composite form is configured to snap fit with the second composite form; and
    wherein the front and rear plates are configured to be manually decoupled along the first and second composite forms.

2. The electrophoretic precast gel substrate of claim 1, wherein each of the front and rear plates comprise an artificial material.

3. The electrophoretic precast gel substrate of claim 2, wherein the artificial material comprises at least one of: PVC, PP, ABS, PS, or PMMA.

4. The electrophoretic precast gel substrate of claim 1, wherein the first and second composite forms are disposed at least along a portion of a periphery of the corresponding front and rear plates.

5. The electrophoretic precast gel substrate of claim 4, wherein each of the first and second composite forms comprises at least one of: a positioning protrusion, a positioning groove, a sealing groove, a sealing rib, or a latch.

6. The electrophoretic precast gel substrate of claim 5, wherein the positioning protrusion and the positioning groove are configured to be coupled and decoupled from each other.

7. The electrophoretic precast gel substrate of claim 6, further comprising a buckle configured to snap fit at least partially around the front and rear plates.

8. The electrophoretic precast gel substrate of claim 7, wherein the positioning protrusion is configured to be inserted into the positioning groove.

9. The electrophoretic precast gel substrate of claim 8, wherein a cross-sectional shape of the positioning protrusion comprises at least one of: a wedge, a rectangle, a trapezoid, or a circle, and wherein a cross-sectional shape of the positioning groove comprises at least one of: a wedge, a rectangle, a trapezoid, or a circle.

10. The electrophoretic precast gel substrate of claim 9, wherein the cross-sectional shape of the positioning protrusion has a width of between about 0.1 mm and 500 mm.

11. The electrophoretic precast gel substrate of claim 5, wherein the sealing groove and sealing rib are configured to be manually coupled and decoupled from each other.

12. The electrophoretic precast gel substrate of claim 11, further comprising a buckle configured to snap fit at least partially around the front and rear plates.

13. The electrophoretic precast gel substrate of claim 12, wherein a cross-sectional shape of the sealing groove comprises at least one of: a wedge, a rectangle, a trapezoid, or a circle, and wherein a cross-sectional shape of the sealing rib comprises at least one of: a wedge, a rectangle, a trapezoid, or a circle.

14. The electrophoretic precast gel substrate of claim 13, wherein the cross-sectional shape of the sealing rib has a width of between about 0.1 mm and 500 mm.

15. The electrophoretic precast gel substrate of claim 13, further comprising the latch configured to couple to the front and rear plates.

16. The electrophoretic precast gel substrate of claim 15, wherein the latch is configured to be disposed between the front and rear plates, and wherein the latch comprises corresponding first and second tenon-and-mortise connective structures.

17. The electrophoretic precast gel substrate of claim 16, wherein a cross-sectional shape of each of the first and second tenon-and-mortise connective structures of the latch comprises at least one of: a wedge, a rectangle, a trapezoid, or a circle.

18. An electrophoretic precast gel substrate comprising:
a front plate comprising a first composite form having a cross-section comprising at least a first and a second shape, the first shape disposed on the first surface of the first composite form and the second shape disposed on the second surface of the first composite form, wherein each of the first and the second shape is selected from a group consisting of: a wedge, a trapezoid, a rectangle, a circle;

a rear plate comprising a second composite form having a cross-section corresponding to the cross-section of the first composite form, wherein each of the first and second composite form comprises snap features configured to provide a snap fit, wherein the front and rear plates are each configured to be manually coupled and decoupled along the first and second composite forms; and a supplementary structure comprising a tenon-and-mortise connective structure selected from a group consisting of a latch and a buckle wherein the supplementary structure is configured to be manually coupled and decoupled to the front plate at least along the tenon-and-mortise connective structure;

wherein a cross-sectional shape of the tenon-and-mortise connective structure comprises at least one of: a wedge, a rectangle, a trapezoid, or a circle.

* * * * *